US012413559B1

(12) United States Patent
Delaney et al.

(10) Patent No.: US 12,413,559 B1
(45) Date of Patent: *Sep. 9, 2025

(54) OBSCURING PARTICIPANTS IN A VIDEOCONFERENCE

(71) Applicant: Cyber IP Holdings, LLC, Herndon, VA (US)

(72) Inventors: Christopher Edward Delaney, Front Royal, VA (US); Carl Bailey Jacobs, Fredericksburg, VA (US); Chava Louis Jurado, Chantilly, VA (US); Michael Vincent Chest, Taylors, SC (US)

(73) Assignee: Cyber IP Holdings, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,980

(22) Filed: Apr. 23, 2024

Related U.S. Application Data

(63) Continuation of application No. 17/549,968, filed on Dec. 14, 2021, now Pat. No. 11,997,074.

(60) Provisional application No. 63/130,040, filed on Dec. 23, 2020.

(51) Int. Cl.
| | | |
|---|---|---|
| H04L 9/40 | (2022.01) | |
| H04L 12/18 | (2006.01) | |
| H04L 65/1045 | (2022.01) | |
| H04L 65/1069 | (2022.01) | |
| H04L 65/403 | (2022.01) | |

(52) U.S. Cl.
CPC ...... *H04L 63/0421* (2013.01); *H04L 12/1822* (2013.01); *H04L 63/0281* (2013.01); *H04L 65/1045* (2022.05); *H04L 65/1069* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 8,045,557 B1 * | 10/2011 | Sun ...................... | H04L 12/189 455/452.2 |
| 11,044,285 B1 | 6/2021 | Delaney et al. | |
| 11,394,694 B1 | 7/2022 | Ademiluyi et al. | |

(Continued)

*Primary Examiner* — Jeffrey R Swearingen
(74) *Attorney, Agent, or Firm* — Jones Day

(57) ABSTRACT

A request is received by a videoconference instantiation server to initiate a videoconference among a plurality of participants. Thereafter, the videoconference instantiation server requests provision of an on-demand computing network. The videoconference server is then instantiated in the on-demand computing network. A plurality of inbound proxies are generated which are configured to communicate with the videoconference server. The inbound proxies obfuscate administrative data passing therethrough. In addition, a plurality of portal proxies are generated that each are configured to communicate with a different one of the inbound proxies. The videoconference instantiation server then generates a unique access path to a different one of the portal proxies for each of the participants. The portal proxies, when accessed, allow the corresponding participant to access a videoconference being executed by the videoconference server. The portal proxies and inbound proxies are terminated upon completion of the videoconference.

20 Claims, 11 Drawing Sheets

(56) References Cited

U.S. PATENT DOCUMENTS

| | | | |
|---|---|---|---|
| 2007/0093238 A1* | 4/2007 | Lin | H04L 12/1822 348/E7.083 |
| 2015/0208031 A1 | 7/2015 | Lievens et al. | |
| 2018/0343560 A1 | 11/2018 | Stein et al. | |

* cited by examiner

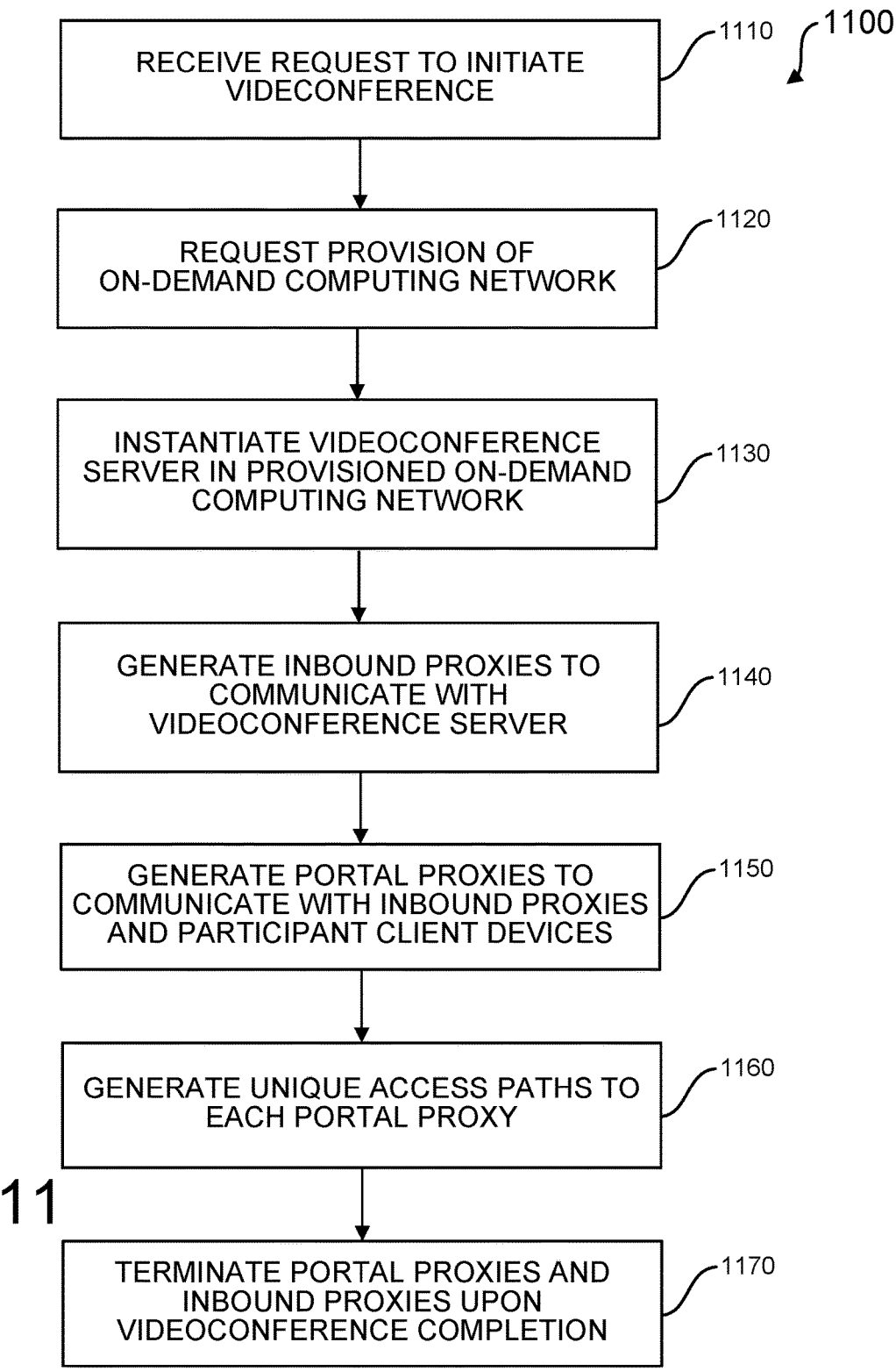

OBSCURING PARTICIPANTS IN A VIDEOCONFERENCE

CROSS-REFERENCE TO RELATED APPLICATIONS

This application is a continuation of U.S. patent application Ser. No. 17/549,968, filed Dec. 14, 2021, which claims priority to U.S. Provisional Application No. 63/130,040, filed Dec. 23, 2020, both of which are incorporated herein by reference in their entireties.

TECHNICAL FIELD

The subject matter described herein relates to techniques for obscuring information identifying participants in a video conference.

BACKGROUND

Videoconferencing is a way for people to collaborate remotely, to share visual content, and communicate using both video and audio. Because of the nature of current videoconference solutions, it is simple to associate multiple users of a videoconference solution, by observing the network connection of the conference server itself, since all participants must connect to that server in order to participate in the conference.

Further, because of the non-routable nature of some IP addresses of users due to Network Address Translation (NAT), technological protocols such as Session Traversal Utilities for NAT (STUN) and Traversal Using Relays around NAT (TURN) are used on the internet to establish what is the actual IP address of the user is, even if that user is using a proxy server of some kind in order to intentionally obfuscate that address. As a result, a user may not be protected by a proxy, and his/her actual public-facing IP address may be made available to conference server operators, other conference participants, and unauthorized third-party observers of the conference server network connection.

SUMMARY

In one aspect, a request is received by a videoconference instantiation server to initiate a videoconference among a plurality of participants. Thereafter, the videoconference instantiation server requests provision of an on-demand computing network. The videoconference server is then instantiated in the on-demand computing network. A plurality of inbound proxies are generated which are configured to communicate with the videoconference server and each corresponding to a different one of the participants. The inbound proxies obfuscate administrative data passing therethrough that identifies a location of the videoconference server and/or a location of one of the participants. In addition, a plurality of portal proxies are generated that each are configured to communicate with a different one of the inbound proxies. The videoconference instantiation server then generates a unique access path to a different one of the portal proxies for each of the participants. The portal proxies, when accessed, allow the corresponding participant to access a videoconference being executed by the videoconference server. Each of the portal proxies and inbound proxies can be terminated upon completion of the videoconference.

The on-demand computing network can be provisioned by an on-demand computing network engine.

The generation of the inbound proxies and/or the portal proxies can be executed by the on-demand computing network engine.

The request can encapsulate a geographic region among a plurality of available geographic regions in which the videoconference server is to be instantiated.

The unique access paths can be distributed to each of the participants via various modalities.

The inbound proxies can be instantiated on one or more virtual machines which are destroyed upon completion of the videoconference.

The portal proxies can be instantiated on one or more microservice instances which are destroyed upon completion of the conference.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many advantages. For example, the current subject matter provides enhanced privacy to participants in a videoconference by allowing their identity and/or location to be anonymous both to other participants but also to a videoconference server 140 and any intervening servers or applications executing in relation thereto. In particular, the current subject matter is advantageous in that it ensures that every participant in a videoconference has a unique network path to that conference, and includes components specifically designed to ensure that protocols such as STUN and TURN cannot reveal a true IP address of a user.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 11 is a process flow diagram illustrating obscuring participants in a videoconference.

Like reference symbols in the various drawings indicate like elements.

DETAILED DESCRIPTION

The current subject matter is directed to advanced techniques for obfuscating information about participants to a web-based collaboration service such as a videoconference from various perspectives. In one aspect, a videoconference server 140 can be provisioned within a secure and obfuscated network, such that its IP address is not discoverable by any third party and is never revealed to the users of the videoconference server 140, even while they are connected to it. In another aspect, a tailored proxy agent can be generated or otherwise provided for each participant. This tailored proxy agent exists between the participant and the videoconference server 140, which alters the network traffic between them (similar to a man-in-the-middle architecture) in such a way as to facilitate communications while hiding the true location of the user from the server and the server from a user.

Figure 1:
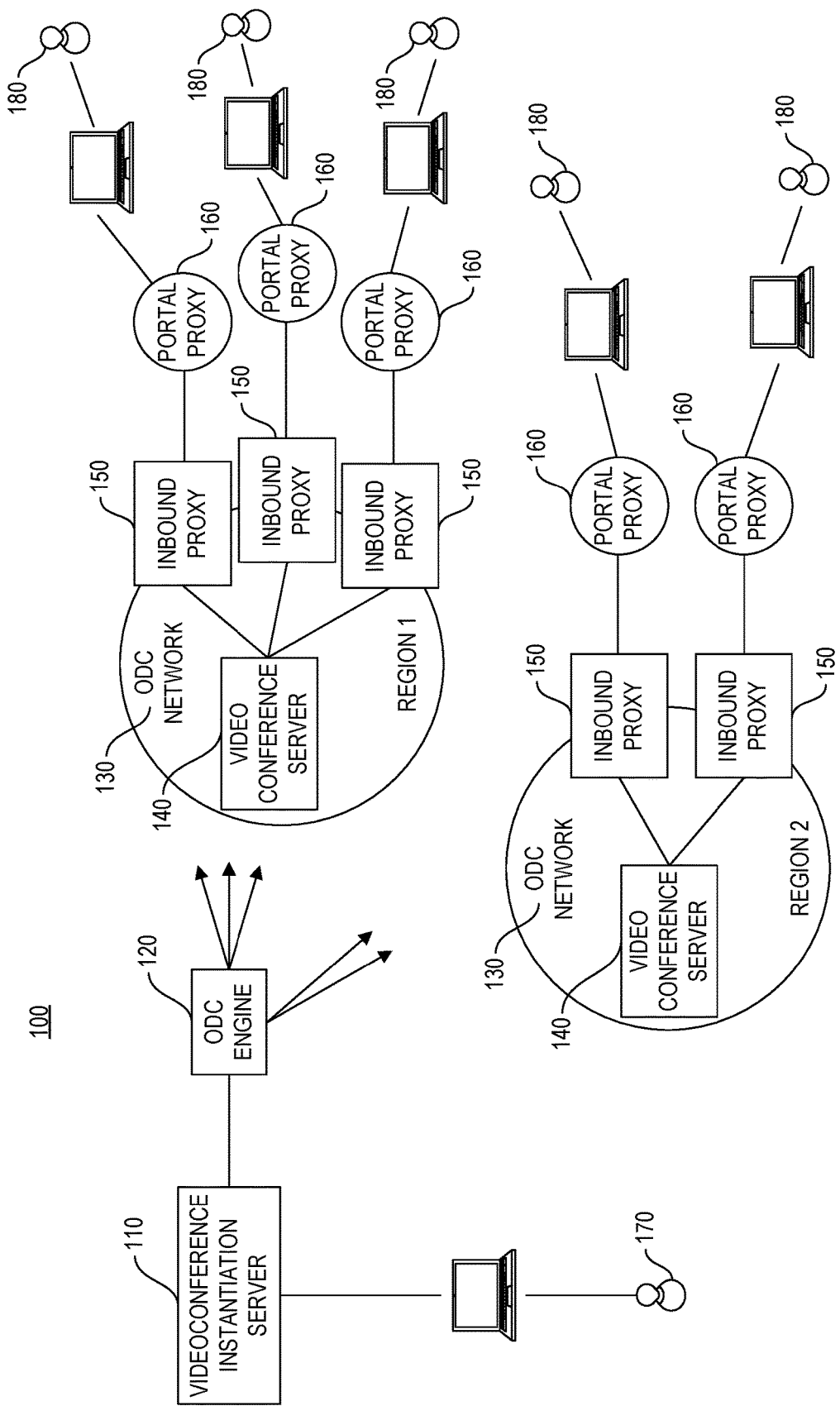
FIG. 1 is a first architecture diagram illustrating a system for obscuring participants in a videoconference.

With reference to diagram 100 of FIG. 1, the current subject matter can comprise or otherwise be executed by various computing nodes each of which can include one or more data processors (e.g., CPUs, GPUs, etc.), memory, and, in some cases, can be distributed across multiple computing devices at the same or different locations. A videoconference instantiation server 110 is a software component running on either a virtual or physical computing device. An on-demand computing (ODC) engine 120 can run on either a virtual or physical computing device, and which may or may not be running on the same computing device as the videoconference instantiation server 110. Example types of ODC engines can be found in U.S. Pat. No. 9,935,850, the contents of which are hereby fully incorporated by reference.

The computing environment can include one or more videoconference servers 140, which can each be software components. Each instance of the videoconference server 140 can execute on its own individual virtual computing device, and that virtual computing device can be contained within an ODC network 130. The ODC network 130, in turn, can be protected by a zero network-profile cryptographically secure network port access (referred to herein as zero network-profile) which is described in U.S. patent application Ser. No. 16/874,767, the contents of which are hereby fully incorporated by reference. The ODC network 130 can be configured such that it is directly inaccessible to any host or other network device other than one that is part of the same ODC network 130. Such configuration can provide that every host in the ODC network 130 is configured such that it has no open or "listening" network ports (i.e. network ports that might be used to connect to a server running on that host, such as a webserver). The host silently drops all network packets directed at it, unless and until it passively observes (without acknowledging) a network packet that contains a cryptographic hash of several values (including the IP address of the sending host, a pre-shared key, and a uniform time code). When the host receives a packet which appears to be formatted as such a cryptographic hash (i.e., it has the appropriate length and consists only of characters used for such hashing), a server within the ODC network 130 calculates its own hash, using its own pre-shared key, its own time code, and the IP address of the sender (which is metadata available to the host as part of the TCP/IP packet header). If (and only if) the host's calculated hash matches the hash contained in the packet does the host determine that the packet was sent from a legitimate and authorized sender; in that event, the host opens one or more network ports (as configured), but only for a brief period of time, and only for the host which sent the correct cryptographic packet; all other hosts scanning or attempting to connect to that host, even on that port, will have their traffic dropped without acknowledgement For each videoconference server 140, one or more inbound proxies 150, which can be software components that each execute on its own individual virtual computing device distinct from the device executing the videoconference server 140, and protected by zero network-profile such that it cannot be contacted by any networked host other than one using the zero network-profile protocol in order to initiate connection.

Each inbound proxy 150 can have a corresponding one or more portal proxies 160 such as those in U.S. Pat. No. 10,080,249, the contents of which are hereby incorporated by reference. The portal proxies 160 can be software components executing on microservice virtual compute instances (e.g. Platform-as-a-Service instances, or container instances) and can be capable of connecting via the zero network-profile protocol to their assigned inbound proxy 150.

Each portal proxy 160 can be generated or otherwise provided for each of one or more participants 180 to access the videoconference server 140, using, for example, an HTML5-capable web browser on a physical or virtual compute device equipped with (typically) a camera, a microphone, a display, and a speaker or other audio output device.

When directed, either by an ad hoc action by an authorized user 170, a configured schedule, or other trigger, the videoconference instantiation server 110 can instantiates a single self-contained and discrete videoconference server 140.

Figure 2:
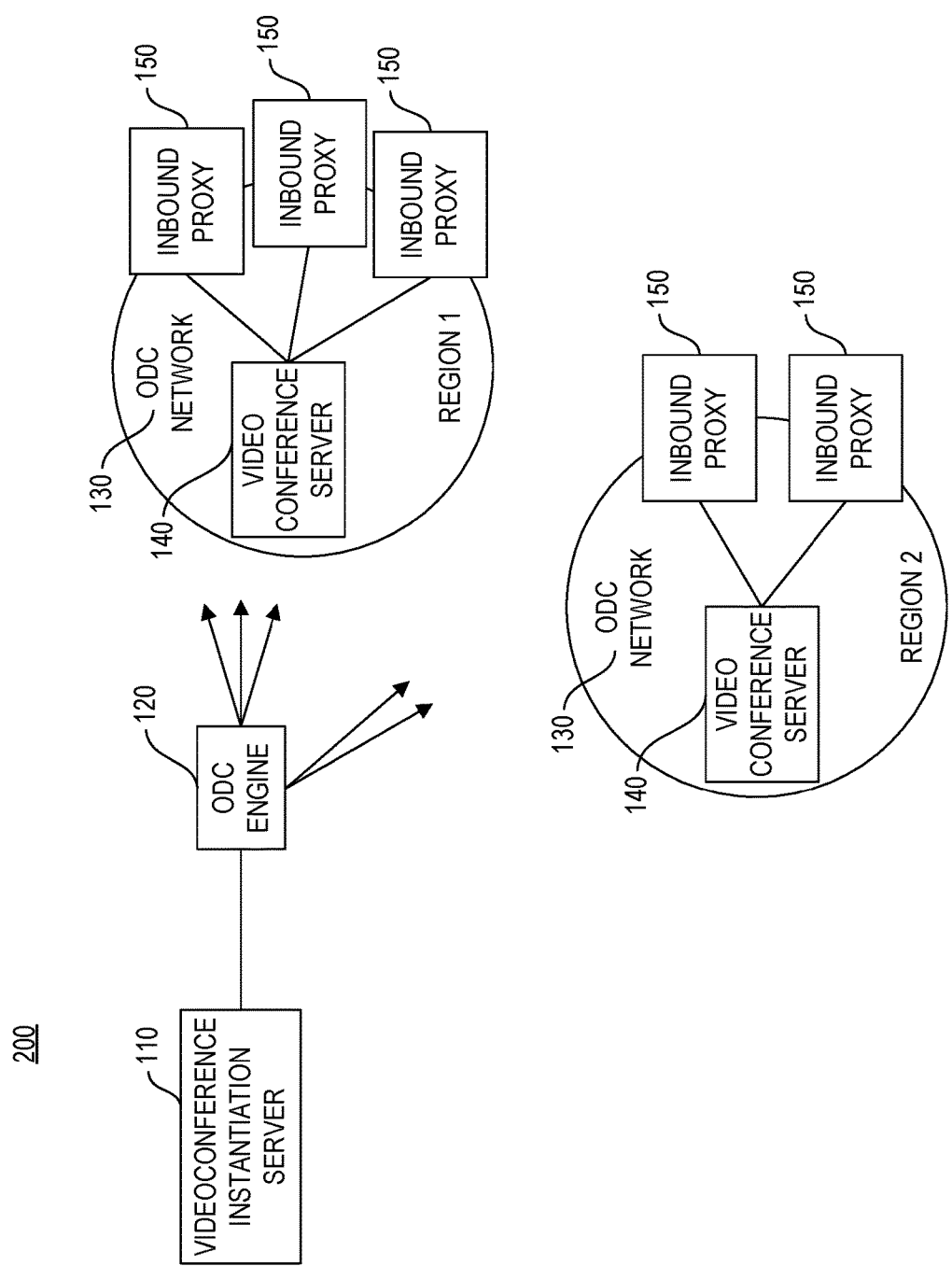
FIG. 2 is a second architecture diagram illustrating the system for obscuring participants in a videoconference.

The videoconference instantiation server 110 can direct the ODC engine 120 to create one or more new ODC network 130(s), in one or more geographic regions. These geographic regions can each contain one videoconference server 140 and one or more inbound proxies. The number of inbound proxies 150 can be determined by a user either at the time the action is initiated, or previously, at the time when the action was scheduled as illustrated in diagram 200 of FIG. 2.

The videoconference instantiation server 110 can direct the ODC engine 120 to create a number of portal proxy 160 instances, the number of which is determined by a user either at the time the action is initiated, or previously, at the time when the action was scheduled.

Figure 3:
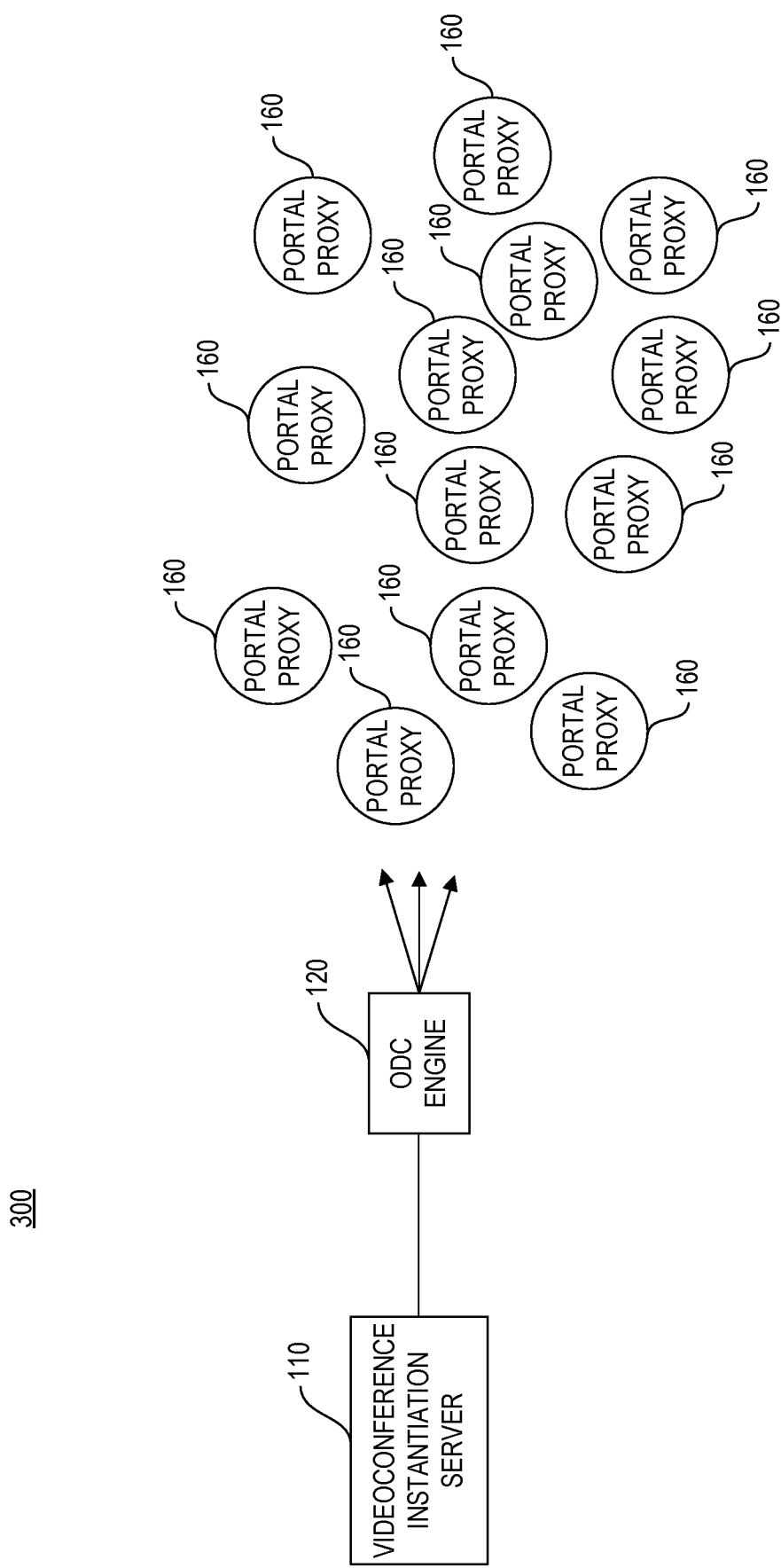
FIG. 3 is a third architecture diagram illustrating the system for obscuring participants in a videoconference.

The videoconference instantiation server 110 can presents a web-accessible user interface, protected by username/password. When an authorized user 170 wishes to make use of a videoconference session, the authorized user 170 logs in to the web-accessible user interface, and requests to reserve a conference. The authorized user 170 then chooses a geographic region from those that are available (with geographic regions providing either better connections or to further obfuscate the locale of the participants 180). The authorized user 170 can indicate the number of discrete participants 180 who will be taking part in the videoconference, and then activate a graphical user interface element such as a button to execute the reservation as in diagram 300 of FIG. 3.

Figure 4:
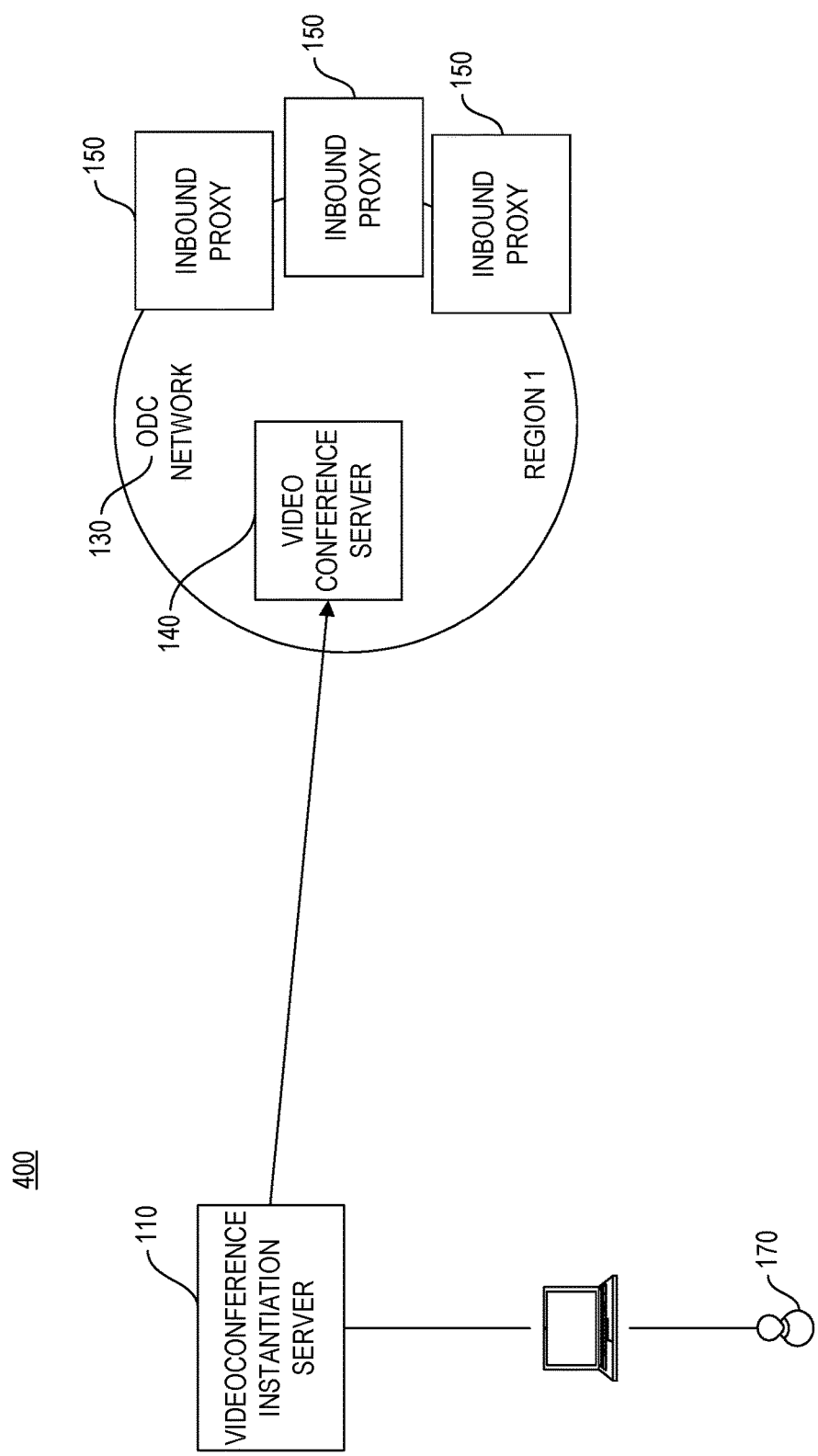
FIG. 4 is a fourth architecture diagram illustrating the system for obscuring participants in a videoconference.

The videoconference instantiation server 110 can use an application programming interface (API) of the videoconference server 140 to create a conference room on the videoconference server 140. The videoconference instantiation server 110 can determine the URL required to reach that particular conference room as in diagram 400 of FIG. 4.

Figure 5:
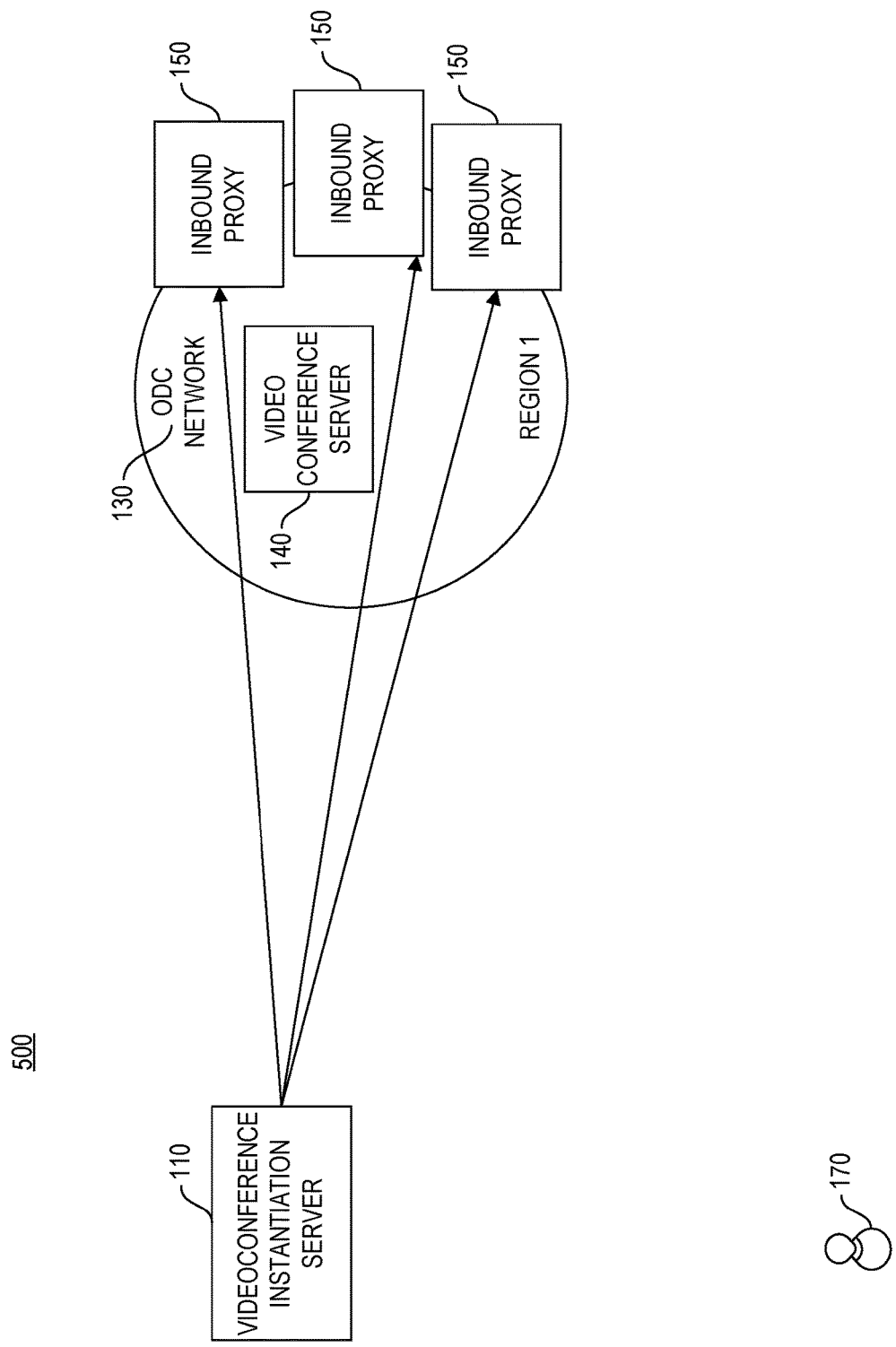
FIG. 5 is a fifth architecture diagram illustrating the system for obscuring participants in a videoconference.

The videoconference instantiation server 110 can then allocate a number of inbound proxy 150 instances equal to the number of discrete participants 180 (as specified by the authorized user 170). The videoconference instantiation server 110 can send a command to each of those inbound proxy 150 instances, indicating the URL they can use to connect to the videoconference server 140 to access the particular conference room that has been allocated to the user as in diagram 500 of FIG. 5.

Figure 6:
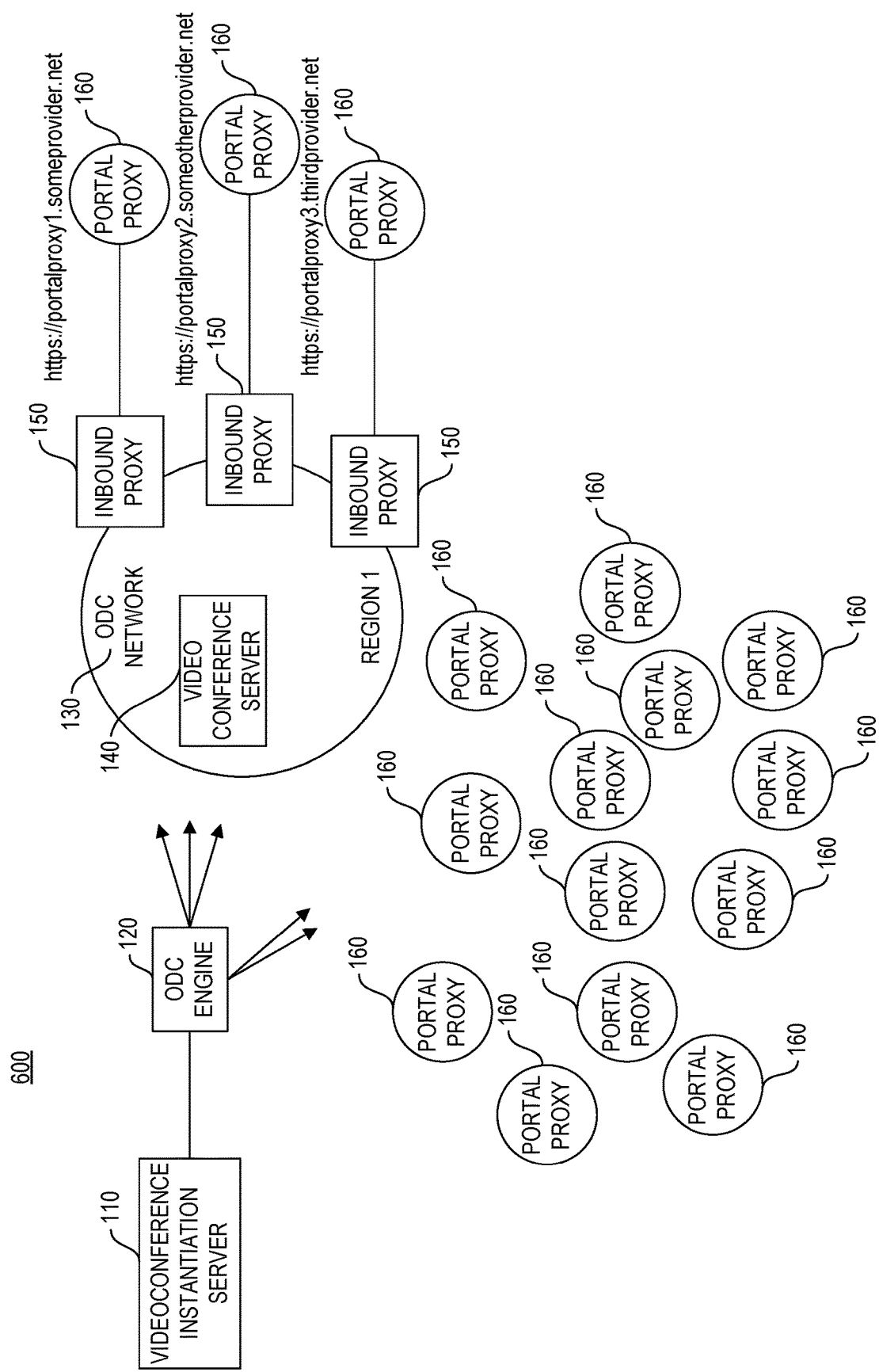
FIG. 6 is a sixth architecture diagram illustrating the system for obscuring participants in a videoconference.

The videoconference instantiation server 110 can then request that an equivalent number of portal proxy 160 instances be allocated to it by the ODC engine 120. Each portal proxy 160 instance can be configured to direct inbound connections it receives to one of the inbound proxy 150 instances, in a 1:1 relationship, so that any one portal proxy 160 will only ever direct connections to one particular inbound proxy 150 instance, and any one inbound proxy 150 instance will only receive connections from one particular portal proxy 160 instance as in diagram 600 of FIG. 6.

Figure 7:
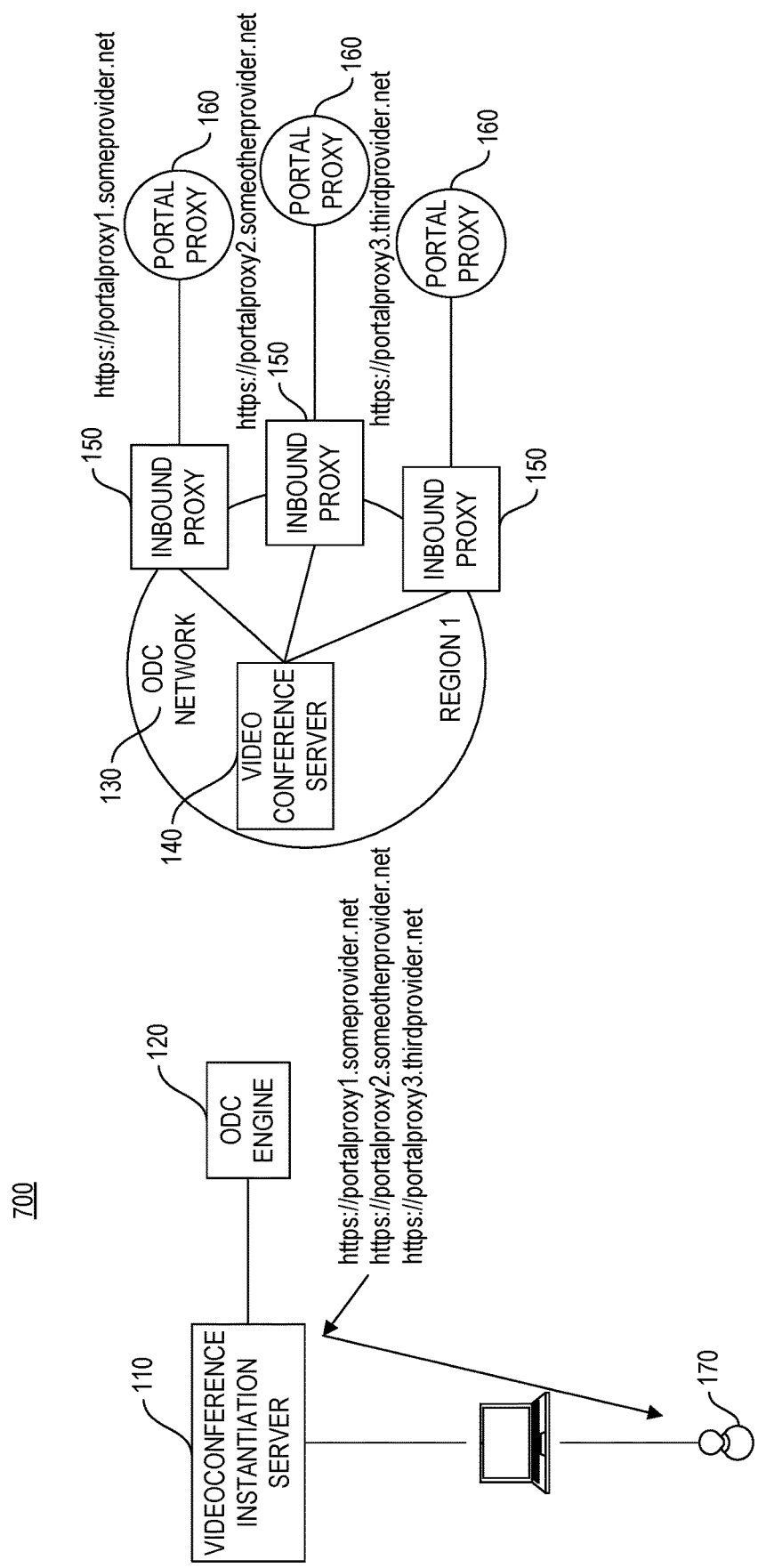
FIG. 7 is a seventh architecture diagram illustrating the system for obscuring participants in a videoconference.

The videoconference instantiation server 110 can gather the unique URLs associated with the allocated portal proxy 150 instances, as specified by the ODC engine 120, and provide them to the authorized user 170 by way of the web user interface of the videoconference instantiation server 110 as in diagram 700 of FIG. 7.

Figure 8:
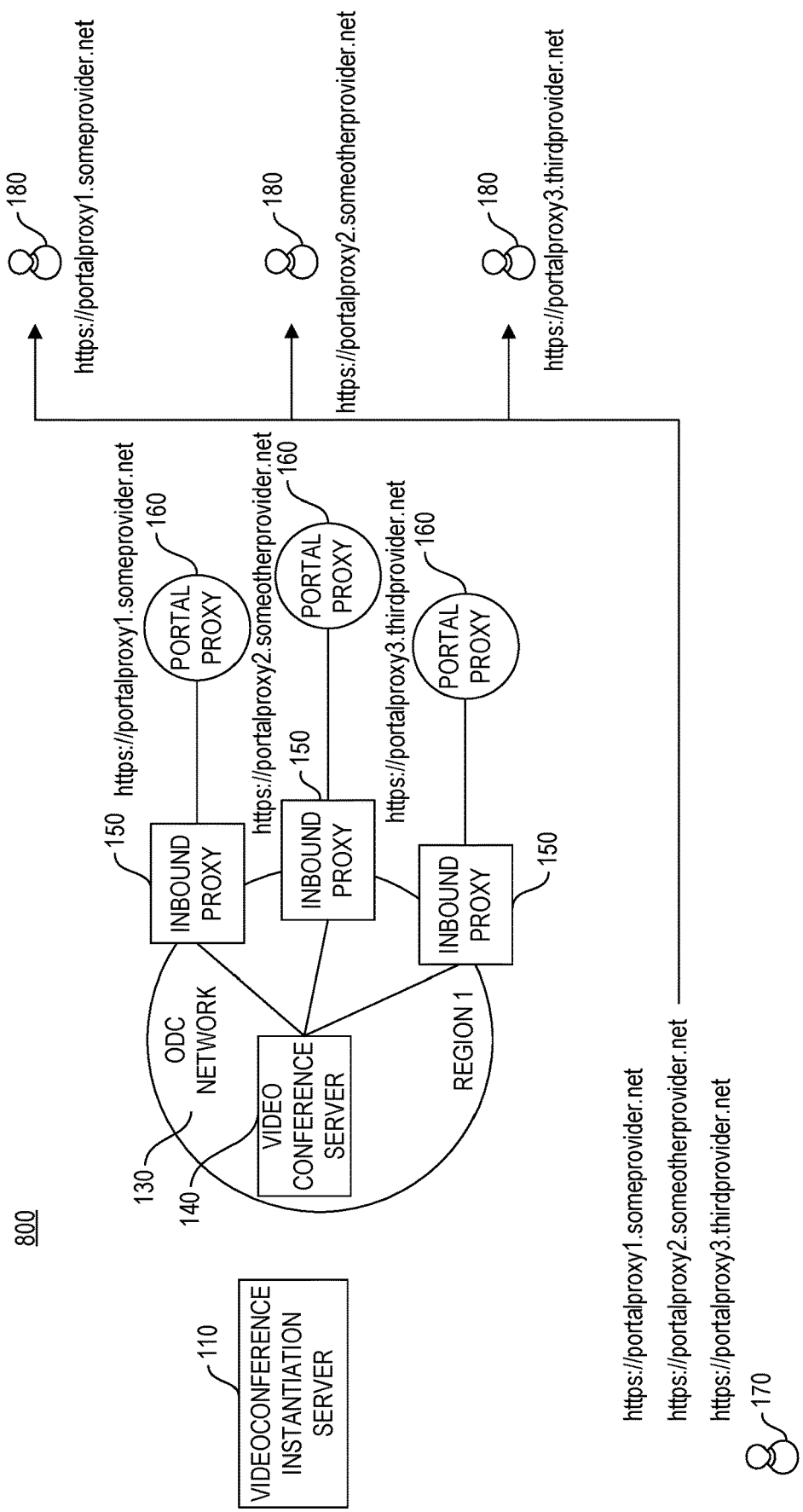
FIG. 8 is an eighth architecture diagram illustrating the system for obscuring participants in a videoconference.

The authorized user 170 can disseminate these unique URLs, one to each desired discrete participant 180 in the conference, by electronic or other means of information transfer as in diagram 800 of FIG. 8.

Figure 9:
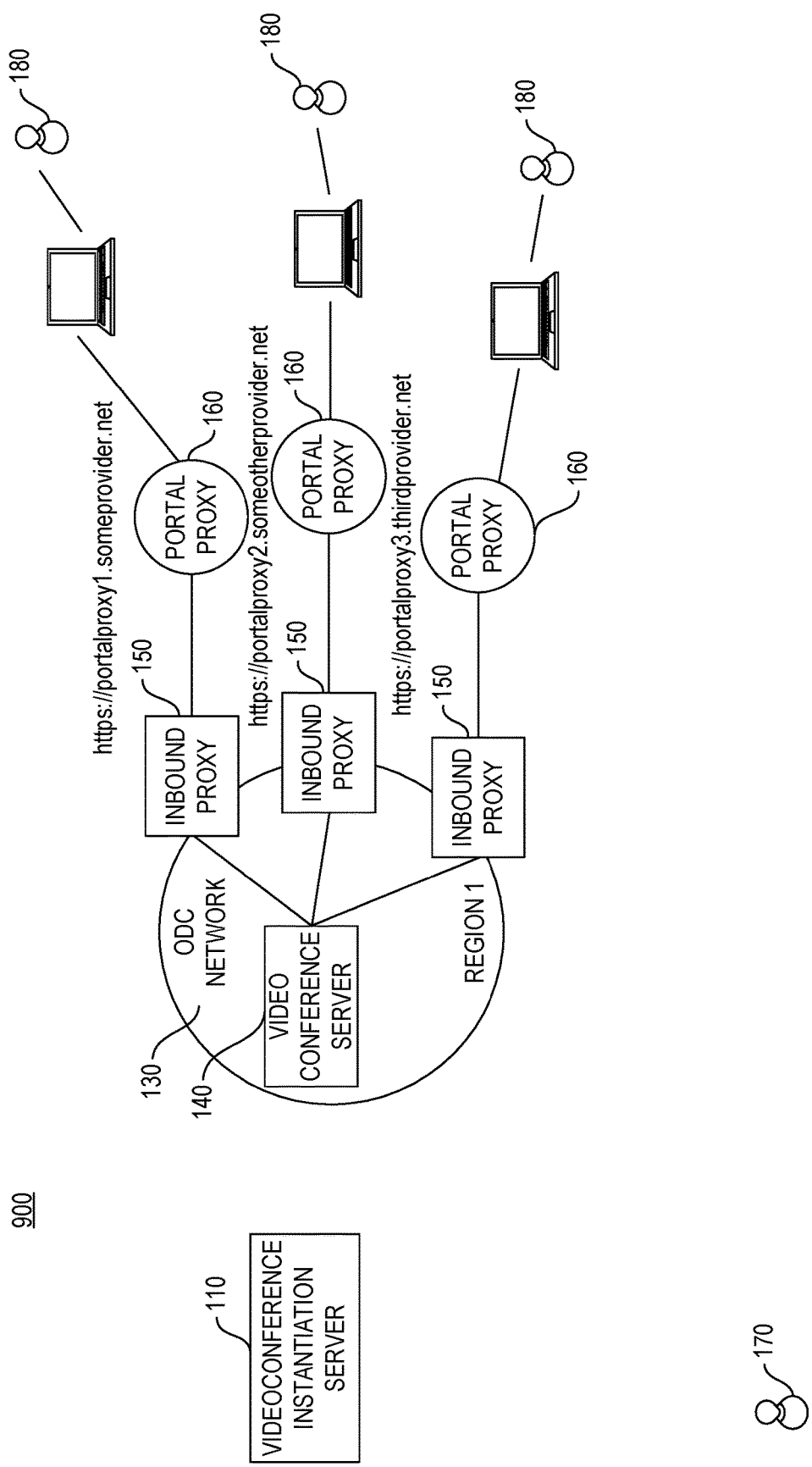
FIG. 9 is a ninth architecture diagram illustrating the system for obscuring participants in a videoconference.

After a discrete participant 180 receives a URL from the authorized user 170 who organized the conference, s/he clicks or otherwise opens the URL in his/her browser, running on his/her physical or virtual computing device as in diagram 900 of FIG. 9. Continuing with FIG. 9, the browser of the participant 180 makes a connection via HTTPS to the portal proxy 160 instance associated with that URL. The portal proxy 160 instance makes use of the zero network-profile protocol to establish a connection to its associated inbound proxy 150 on behalf of the participant 180. This arrangement can be accomplished by creating a cryptographic token comprising a number of values including a pre-shared key, the IP address of the sending host, and a time code value, which are then combined using a cryptographic hashing algorithm, which renders a cryptographically-unique alphanumeric string, which is then encapsulated in a network packet and sent, without expectation of acknowledgement, to the IP address of the host that a connection is desired with.

The inbound proxy 150 can accept the connection from the participant 170 as if it were, itself, a videoconference server 140. The inbound proxy 150 can then make a separate connection, via the ODC network 130, to the videoconference server 140 that is located on that network, using the URL it was configured with. The inbound proxy 150 appears to the videoconference server 140 to be the actual client. Further, the inbound proxy 150 appears to the browser of the participant 180 to be the videoconference server 140.

The inbound proxy 150 can be configured to accept the connection from the participant 170 in a manner consistent with the Transfer Control Protocol (TCP) internet protocol, and therefore act as a server from the connecting client's perspective. The network connection from the client terminates at the inbound proxy 150, and the inbound proxy 150 has access to all of the data that the client sends.

The inbound proxy 150 can then initiate a connection, acting as a client, using the TCP internet protocol, to the videoconference server 140. The connection from the server terminates at the inbound proxy 150, and the inbound proxy 150 can have access to all of the data that the server sends.

The inbound proxy 150 can pass administrative, video, and audio data back and forth between the browser of the participant 180 and the videoconference server 140. The inbound proxy 150 can modify the administrative data in both directions in order to ensure that the videoconference server 140 never receives any information about the true location of the browser client, and the browser client never receives any information about the true location of the videoconference server 150.

Figure 10:
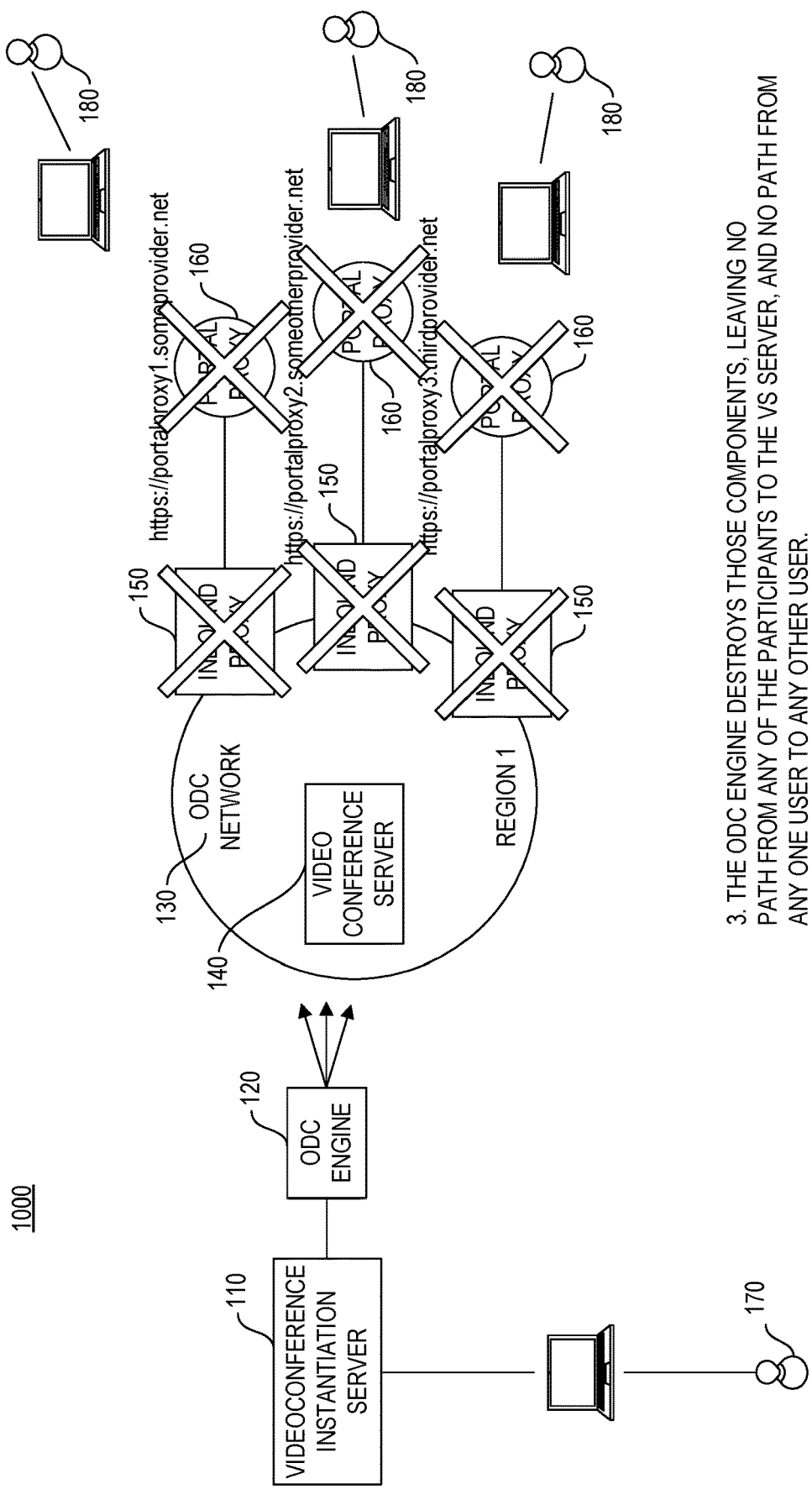
FIG. 10 is a tenth architecture diagram illustrating the system for obscuring participants in a videoconference.

When the conference is concluded, the user who reserved the conference can return to the web user interface of the videoconference instantiation server 110 request that the conference be terminated as in diagram 1000 of FIG. 10. Also with reference to FIG. 10, the videoconference instantiation server 110 can direct the ODC engine 120 to destroy the virtual machines that hosted the inbound proxies 150, as well as the microservice instances that hosted the portal proxy 160 instances used for the conference.

As all of the inbound proxy 150 instances and portal proxy 160 instances are destroyed once a conference is complete, there is no path from any participant back to the location of the videoconference server 140, so neither the participant 180 nor someone observing the traffic of the participant 180 can perform a forensic analysis in order to determine the location of the videoconference server 140.

In addition, because every discrete participant 180 has his/her own distinct portal proxy 160 instance and inbound proxy 150 instance allocated to him or her, and because those portal proxy 160 instances only ever communicate directly with the participant 180 and the inbound proxy 150, and because the inbound proxy 150 only ever communicates with the portal proxy 160, and with the videoconference server 140 over the ODC network 130, there is no way for the participant 180, or anyone observing the traffic of the participant 180, to determine the network or physical location of any other participant 180 in the conference.

Likewise, while a participant 180 can determine the number of other participants 180 in the conference, since the connection between the participant 180 and the associate portal proxy 160 instance is encrypted using, for example, HTTPS, an entity observing the network traffic of the participant 180 cannot determine the nature or content of the traffic, or the nature or number of other users the participant 180 was communicating with.

FIG. 11 is a process flow diagram 1100 in which, at 1110, a request is received by a videoconference instantiation server, to initiate a videoconference among a plurality of participants. Thereafter, at 1120, the videoconference instantiation server requests provision of an on-demand computing network. A videoconference server is then instantiated, at 1130, in the on-demand computing network. A plurality of inbound proxies are generated, at 1140, which are configured to communicate with the videoconference server and each corresponding to a different one of the participants. The inbound proxies obfuscate administrative data passing therethrough that identifies a location of the videoconference server and/or a location of one of the participants. In addition, at 1150, a plurality of portal proxies are generated that each are configured to communicate with a different one of the inbound proxies. The videoconference instantiation server then generates, at 1160, a unique access path to a different one of the portal proxies for each of the participants, the portal proxies, when accessed, allowing the corresponding participant to access a videoconference being executed by the videoconference server. Subsequently, at 1170, each of the portal proxies and inbound proxies are terminated upon completion of the videoconference.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. For example, while the examples above are directed to web-based videoconferences, it will be appreciated that the current subject matter is applicable to any type of collaboration service including in which there is a one-to-one or one-to-many form of interaction which uses a network connection between each participant and a central server. Example applications include email, text chat, voice conferencing, file sharing, and telephony as well as other applications or services utilizing data transfer between two or more parties which access a server as part of the interaction. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving a request to initiate a videoconference among a plurality of participants;
   instantiating a videoconference server in an on-demand computing network;
   generating a plurality of first proxies configured to communicate with the videoconference server and each corresponding to a different one of the plurality of participants;
   generating a plurality of second proxies each configured to communicate with a different one of the plurality of first proxies; and generating an access path to a different one of the plurality of second proxies for each of the plurality of participants, the plurality of second proxies, when accessed, allowing the corresponding participant to access a videoconference being executed by the videoconference server.

2. The method of claim 1, wherein the on-demand computing network is provisioned by an on-demand computing network engine.

3. The method of claim 2, wherein the generating a plurality of first proxies is executed by the on-demand computing network engine.

4. The method of claim 2, wherein the generating a plurality of second proxies is executed by the on-demand computing network engine.

5. The method of claim 1, wherein the request encapsulates a geographic region among a plurality of available geographic regions in which the videoconference server is to be instantiated.

6. The method of claim 1 further comprising:
causing a unique access path to be distributed to each of the plurality of participants.

7. The method of claim 1, wherein the plurality of first proxies are instantiated on one or more virtual machines which are destroyed upon completion of the videoconference.

8. The method of claim 1, wherein the plurality of second proxies are instantiated on one or more microservice instances which are destroyed upon completion of the videoconference.

9. A system comprising:
at least one data processor; and
memory storing instructions which, when executed by the at least one data processor, implement operations comprising:
receiving a request to initiate a videoconference among a plurality of participants;
instantiating a videoconference server in an on-demand computing network;
generating a plurality of first proxies configured to communicate with the videoconference server and each corresponding to a different one of the plurality of participants;
generating a plurality of second proxies each configured to communicate with a different one of the plurality of first proxies; and
generating an access path to a different one of the plurality of second proxies for each of the plurality of participants, the plurality of second proxies, when accessed, allowing the corresponding participant to access a videoconference being executed by the videoconference server.

10. The system of claim 9, wherein the on-demand computing network is provisioned by an on-demand computing network engine.

11. The system of claim 10, wherein the generating a plurality of first proxies is executed by the on-demand computing network engine.

12. The system of claim 10, wherein the generating a plurality of second proxies is executed by the on-demand computing network engine.

13. The system of claim 9, wherein the request encapsulates a geographic region among a plurality of available geographic regions in which the videoconference server is to be instantiated.

14. The system of claim 9, wherein the operations further comprise:
causing a unique access path to be distributed to each of the plurality of participants.

15. The system of claim 9, wherein the plurality of first proxies are instantiated on one or more virtual machines which are destroyed upon completion of the videoconference.

16. The system of claim 9, wherein the plurality of second proxies are instantiated on one or more microservice instances which are destroyed upon completion of the videoconference.

17. A computer-implemented method comprising:
receiving a request to initiate a videoconference among a plurality of participants;
instantiating a videoconference server in an on-demand computing network;
generating a plurality of first proxies configured to communicate with the videoconference server and each corresponding to a different one of the plurality of participants;
generating a plurality of second proxies each configured to communicate with a different one of the plurality of first proxies; and
generating an access path to a different one of the plurality of second proxies for each of the plurality of participants, the plurality of second proxies, when accessed, allowing the corresponding participant to access a videoconference being executed by the videoconference server.

18. The method of claim 17, wherein the on-demand computing network is provisioned by an on-demand computing network engine.

19. The method of claim 18, wherein the generating a plurality of first proxies and the generating a plurality of second proxies are both executed by the on-demand computing network engine.

20. The method of claim 1, wherein the request encapsulates a geographic region among a plurality of available geographic regions in which the videoconference server is to be instantiated.

* * * * *